United States Patent [19]
Southwell

[11] Patent Number: 5,410,431
[45] Date of Patent: Apr. 25, 1995

[54] MULTI-LINE NARROWBAND-PASS FILTERS

[75] Inventor: William H. Southwell, Thousand Oaks, Calif.

[73] Assignee: Rockwell International Corporation, Seal Beach, Calif.

[21] Appl. No.: 70,126

[22] Filed: Jun. 1, 1993

[51] Int. Cl.⁶ .............................................. G02B 5/28
[52] U.S. Cl. ................................. 359/580; 359/588; 359/589
[58] Field of Search ................ 359/580, 586, 589, 590

[56] References Cited

U.S. PATENT DOCUMENTS

| | | | |
|---|---|---|---|
| 3,279,317 | 10/1966 | Ploke | 359/589 |
| 3,423,147 | 1/1969 | Thelen | 359/589 |
| 3,504,959 | 4/1970 | Hennessey | 359/590 |
| 3,519,339 | 7/1970 | Hutchinson et al. | 359/589 |
| 3,551,017 | 12/1970 | Iwasaki et al. | 359/589 |
| 4,756,602 | 7/1988 | Southwell | 350/166 |
| 4,826,267 | 5/1989 | Hall | 350/1.6 |
| 4,952,025 | 8/1990 | Gunning | 350/164 |
| 5,049,780 | 9/1991 | Dobrowolski et al. | 359/580 |
| 5,138,219 | 8/1992 | Krisl et al. | 359/589 |
| 5,179,468 | 1/1993 | Gaslow | 359/589 |
| 5,181,143 | 1/1993 | Southwell | 359/586 |
| 5,274,661 | 12/1993 | von Gunten et al. | 359/580 |

FOREIGN PATENT DOCUMENTS

| | | | |
|---|---|---|---|
| 61-296306 | 12/1986 | Japan | 359/590 |
| 62-299905 | 12/1987 | Japan | 359/589 |

OTHER PUBLICATIONS

Macleod, Thin-Film Optical Filters, pp. 170, 194, & 238 (Macmillan 2d ec 1986).
Turner, et al., Multilayer mirrors with reflectance over an extended spectral region, Journal of Applied Optics, vol. 5, pp. 69–76 (1966).

Primary Examiner—Martin Lerner
Attorney, Agent, or Firm—John J. Deinken

[57] ABSTRACT

A multiple pass band, thin film optical filter includes a first single pass band filter having a first pass band at a first wavelength, with a first quarterwave stack of thin film layers alternating between layers of a first dielectric material having a first refractive index and layers of a second dielectric material having a second refractive index, the optical thickness of each layer in the first stack being substantially one fourth of the first wavelength. A first half wave layer is interposed within the first stack and has an optical thickness which is an integral multiple of one half of the first wavelength, such that the reflectivities of the portions of the first stack on either side of the first half wave layer are substantially identical. A second single pass band filter having a second pass band at a second wavelength, includes a second quarterwave stack of thin film layers alternating between layers of the first dielectric material and layers of the second dielectric material, the optical thickness of each layer in the second stack being substantially one fourth of the second wavelength, and a second half wave layer interposed within the second stack having a thickness which is an integral multiple of one half of the second wavelength, such that the reflectivities of the portions of the second stack on either side of the second half wave layer are substantially identical. The first and second single pass band filters are combined in series to provide a filter with a pass band at the first wavelength and a pass band at the second wavelength.

4 Claims, 14 Drawing Sheets

FIGURE 1

(PRIOR ART)

FIGURE 2

(PRIOR ART)

MULTI-LINE NARROWBAND-PASS FILTERS

BACKGROUND OF THE INVENTION

This invention is concerned with the design of optical coatings for controlling the manner in which light of particular wavelengths is transmitted by or reflected from an optical surface.

Optical interference, which modifies the transmitted and reflected intensities of light, occurs with the superposition of two or more beams of light. The principle of superposition states that the resultant amplitude is the sum of the amplitudes of the individual beams. The brilliant colors, for example, which may be seen when light is reflected from a soap bubble or from a thin layer of oil floating on water are produced by interference effects between two trains of light waves. The light waves are reflected at opposite surfaces of the thin film of soap solution or oil.

One important practical application for interference effects in thin films involves the production of coated optical surfaces. If a film of a transparent substance is deposited on glass, for example, with a refractive index which is properly specified relative to the refractive index of the glass and with a thickness which is one fourth of a particular wavelength of light in the film, the reflection of that wavelength of light from the glass surface can be almost completely suppressed. The light which would otherwise be reflected is not absorbed by a nonreflecting film; rather, the energy in the incident light is redistributed so that a decrease in reflection is accompanied by a concomitant increase in the intensity of the light which is transmitted.

Considerable improvements have been achieved in the antireflective performance of such films by using a composite film having two or more superimposed layers. Two different materials may be used in fabricating such a composite film, one with a relatively high index of refraction and the other with a relatively low index of refraction. The two materials are alternately deposited to specified thicknesses to obtain the desired optical characteristics for the film. In theory, it is possible with this approach to design multiple layer interference coatings for a great variety of transmission and reflection spectrums. This has led to the development of many new optical devices making use of complex spectral filter structures. Antireflection coatings, laser dielectric mirrors, television camera edge filters, optical bandpass filters, and band rejection filters are some of the examples of useful devices employing thin film interference coatings.

One particular type of interference coating is the narrowband-pass filter, which is designed to allow wavelengths within a narrow range of the desired pass band to be transmitted, while a range of wavelengths on either side of the pass band are highly reflected. Such filters are known in the prior art with multiple pass bands, but have been limited by the requirement for the pass bands to be uniformly spaced in wave number. A more versatile design, in which the pass band wavelengths could be arbitrarily specified, would be useful in many applications.

SUMMARY OF THE INVENTION

A multiple pass band, thin film optical filter provides at least two pass bands located at arbitrary wavelengths. The filter includes a first single pass band filter having a first pass band at a first wavelength, with a first quarterwave stack of thin film layers alternating between layers of a first dielectric material having a first refractive index and layers of a second dielectric material having a second refractive index, the optical thickness of each layer in the first stack being substantially one fourth of the first wavelength. A first half wave layer is interposed within the first stack and has an optical thickness which is an integral multiple of one half of the first wavelength, such that the reflectivities of the portions of the first stack on either side of the first half wave layer are substantially identical. A second single pass band filter having a second pass band at a second wavelength, includes a second quarterwave stack of thin film layers alternating between layers of the first dielectric material and layers of the second dielectric material, the optical thickness of each layer in the second stack being substantially one fourth of the second wavelength, and a second half wave layer interposed within the second stack having a thickness which is an integral multiple of one half of the second wavelength, such that the reflectivities of the portions of the second stack on either side of the second half wave layer are substantially identical. The first and second single pass band filters are combined in series to provide a filter with a pass band at the first wavelength and a pass band at the second wavelength.

Alternatively, the first half wave layer may be replaced by a first pair of half wave layers interposed within the first stack and each having an optical thickness which is an integral multiple of one half of the first wavelength, such that the reflectivities of the portions of the first stack on either side of the first half wave layer pair are substantially identical, and the second half wave layer may be replaced by a second pair of half wave layers interposed within the second stack and each having an optical thickness which is an integral multiple of one half of the second wavelength, such that the reflectivities of the portions of the second stack on either side of the second half wave layer pair are substantially identical. In this embodiment the first and second single pass band filters are combined in series to provide a filter with double cavity pass bands at the first and second wavelengths.

The filter may further include a third single pass band filter having a third pass band at a third wavelength, with a third quarterwave stack of thin film layers alternating between layers of the first dielectric material and layers of the second dielectric material, the optical thickness of each layer in the third stack being substantially one fourth of the third wavelength, and a third half wave layer interposed within the third stack having a thickness which is an integral multiple of one half of the third wavelength, such that the reflectivities of the portions of the third stack on either side of the third half wave layer are substantially identical, the first, second, and third single pass band filters being combined in series to provide a filter with pass bands at the first, second, and third wavelengths.

In addition, the filter may include a third half wave layer interposed between the first and second single pass band filters having a thickness which is an integral multiple of one half of a third wavelength, thereby providing the third pass band.

The wavelength position of any of the pass bands may be adjusted by adjusting the thickness of the corresponding half wave layer.

DESCRIPTION OF THE INVENTION

Figure 1:
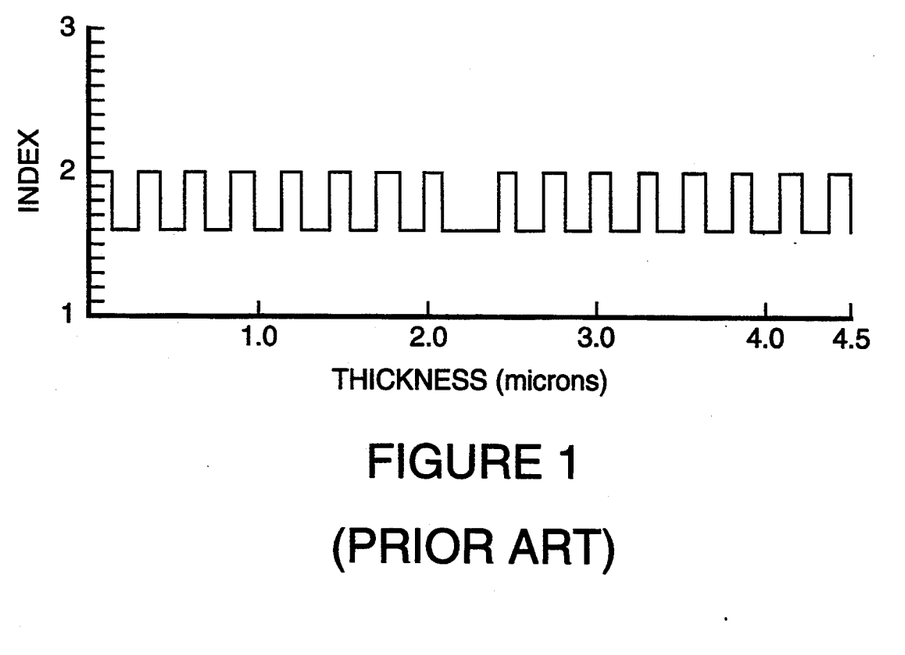
FIG. 1 is a plot of refractive index as a function of thickness for a prior art single Fabry-Perot cavity thin film filter of the form Air (HL)$^7$H2L(HL)$^7$H Glass.
Figure 2:
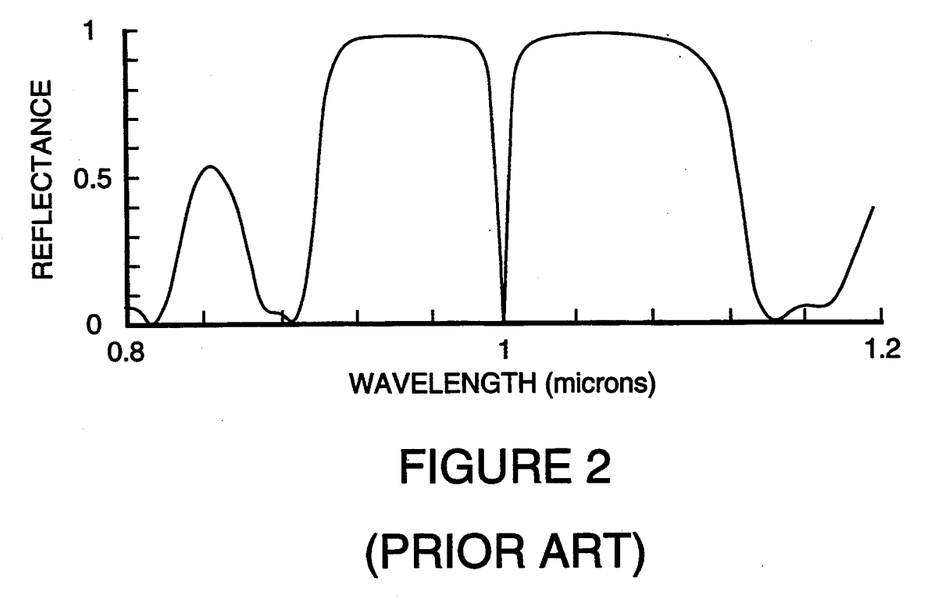
FIG. 2 is a plot of reflectance as a function of wavelength for the single cavity filter defined by the profile of FIG. 1.

The simplest narrowband-pass filter is a thin-film Fabry-Perot cavity consisting of a quarterwave stack with a multiple halfwave spacer or transition layer in the center of the quarterwave stack, as shown in FIG. 1, which is a plot of refractive index as a function of thickness for such a filter design, and FIG. 2, which is a plot of the calculated reflectance as a function of wavelength which will be achieved by such a filter. Such a cavity filter can exhibit a series of pass bands if the reflectance bands are broad enough and the spacer layer is thick enough. Such pass bands, however, will be uniformly spaced in wave number (See, for example, H. A. Macleod, Thin-Film Optical Filters, Pages 170, 194, & 238 (Macmillan 2nd ed. 1986)). The need sometimes arises for a multi-line narrowband-pass filter in which the wavelengths of the pass bands can be arbitrarily, rather than uniformly, spaced.

It is an outstanding feature of this invention to provide such multiple pass band, thin film optical filters with at least two pass bands located at arbitrary wavelengths. A particular example is useful to illustrate the design and fabrication of the inventive filters. Suppose it is desired to have a filter which passes three wavelengths, 0.9$\mu$, 1.0$\mu$, and 1.06$\mu$. These pass bands are non-uniform, since the third line would have to be at 1.125$\mu$ to be uniform.

The general approach is to use contiguous cavity filters (i.e., stacked in series), joined with a quarterwave transition layer in the same way quarterwave stop band stacks of different wavelengths may be joined to extend the width of the stop band (See, for example, A. F. Turner and P. W. Baumeister, Multilayer mirrors with reflectance over an extended spectral region, Journal of Applied Optics, Volume 5, Pages 69-76 (1966)). Each constituent cavity filter contains one pass band. For single cavity stacks the transition layer may be made a halfwave, thus producing three pass bands with only two cavity stacks.

Figure 3:
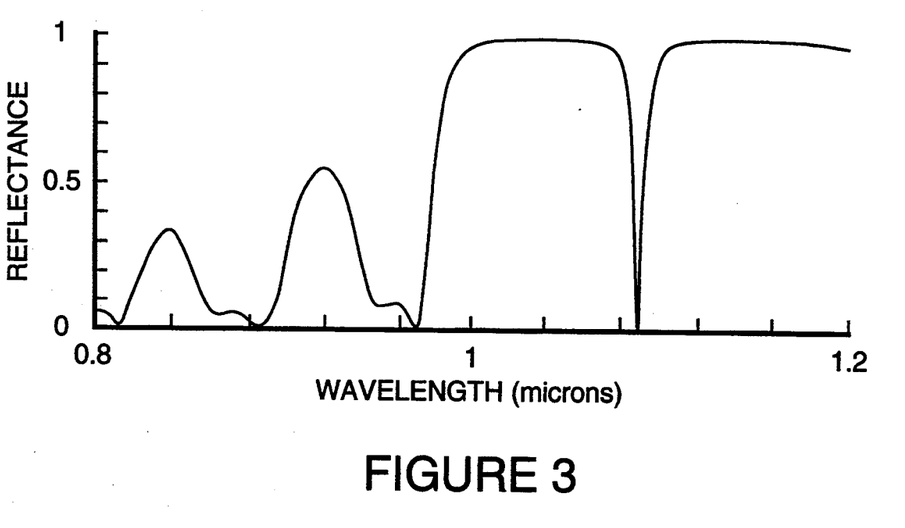
FIG. 3 is a plot of reflectance as a function of wavelength for the single cavity filter of FIG. 2, except that the cavity is shifted upward in wavelength by making the layers thicker by a factor of 1.092.
Figure 4:
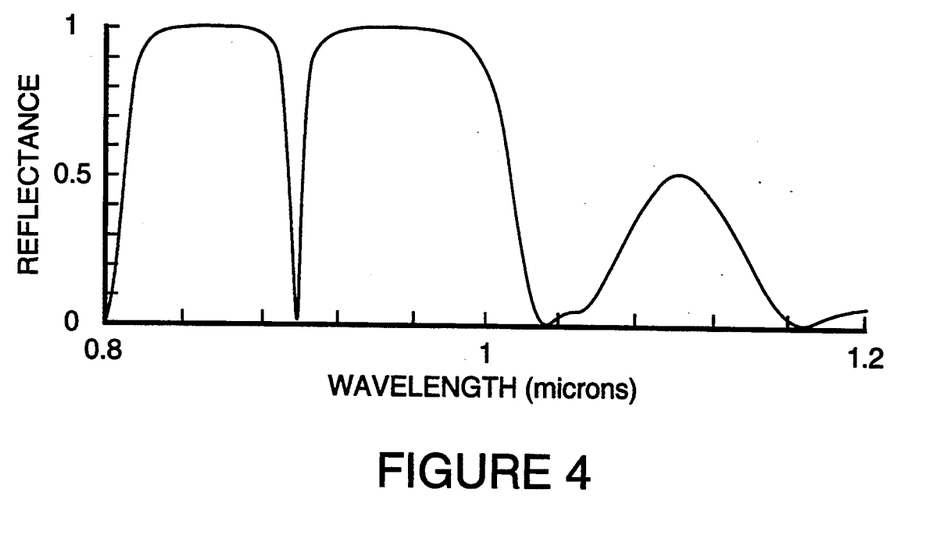
FIG. 4 is a plot of reflectance as a function of wavelength for the single cavity filter of FIG. 2, except that the cavity is shifted downward in wavelength by making the layers thinner by a factor of 0.90, making the edges of the stop bands for the cavities in FIGS. 3 and 4 continuous.

The cavity design of FIGS. 1 and 2 is first scaled up and down, as shown in FIGS. 3 and 4, with the cavity of FIG. 3 shifted upward in wavelength by making the layers thicker by a factor of 1.092 and the cavity of FIG. 4 shifted downward in wavelength by making the layers thinner by a factor of 0.90. This results in two stacks whose stop bands are shoulder-to-shoulder at $\lambda=1$. Although the same analytic expression exists for the edge of the stop bands for stacks of the form (HL)$^n$ or (0.5HL0.5H)$^n$ (where H denotes a layer of a dielectric material with a relatively high refractive index and L denotes a layer of a dielectric material with a relatively low refractive index, the exponent n indicating the number of times the layer sequence is repeated in the stack), attempts to derive a similar expression for the outer stop band edges of cavity filters has not been successful. Nevertheless, reasonable estimates are easily obtained from plots like FIGS. 1 and 2. Note that the edges of the stop bands of symmetrical quarterwave stacks, such as (HL)$^n$H, do not satisfy the analytical expression mentioned above. Moreover, whenever a middle layer (of any type of stack) is made halfwave, thus forming a cavity filter, the outer edges of the stop band broaden. In addition, the wavelength position of the pass band may be shifted by an adjustment of the thickness of the spacer layer.

Figure 5:
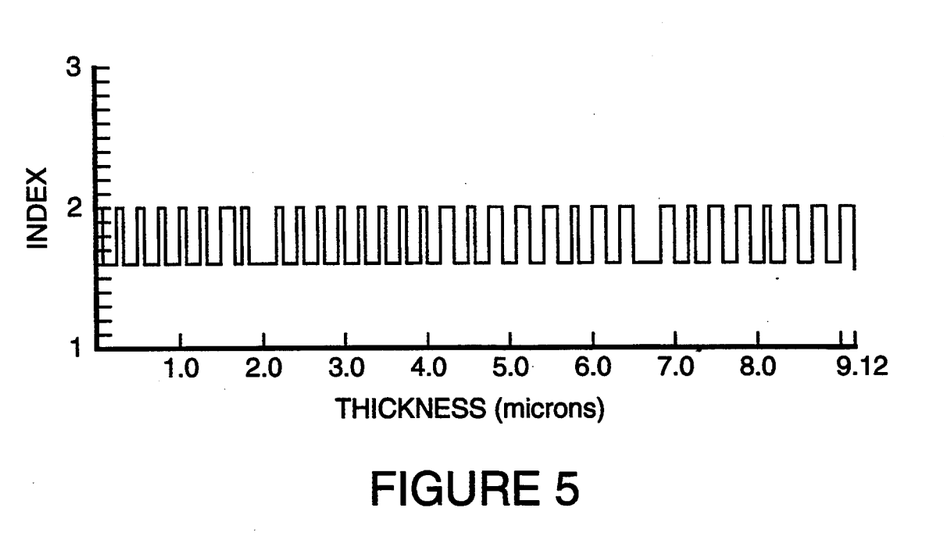
FIG. 5 is a plot of refractive index as a function of thickness for the combined single cavity filters shown in FIGS. 3 and 4, with a quarterwave low-index layer as a transition layer.
Figure 6:
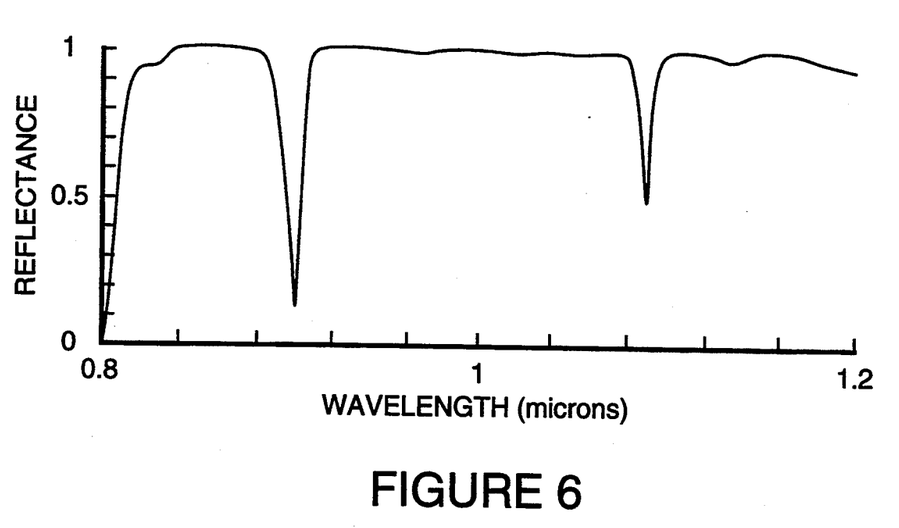
FIG. 6 is a plot of reflectance as a function of wavelength for the two cavity filter defined by the refractive index profile of FIG. 5.
Figure 7:
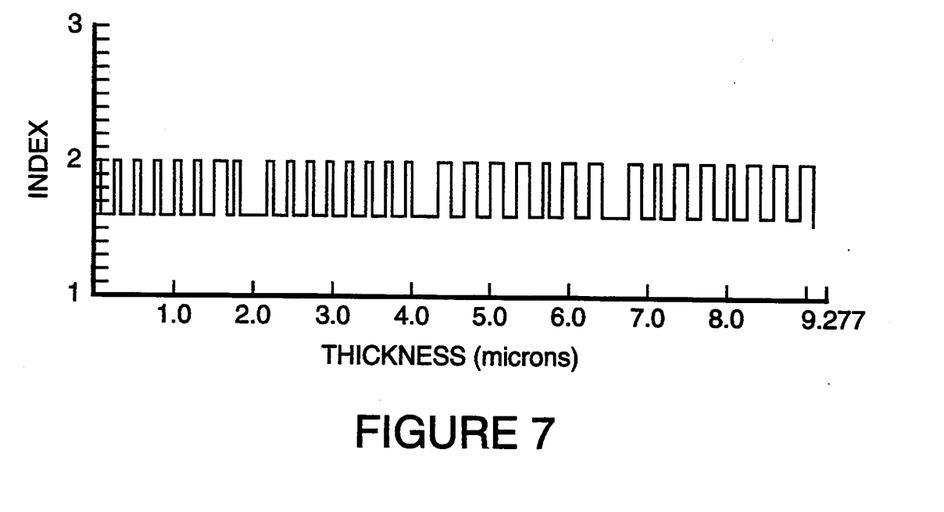
FIG. 7 is a plot of refractive index as a function of thickness for combined single cavity filters, as in FIG. 5, except that a halfwave transition layer is used between the two stacks.
Figure 8:
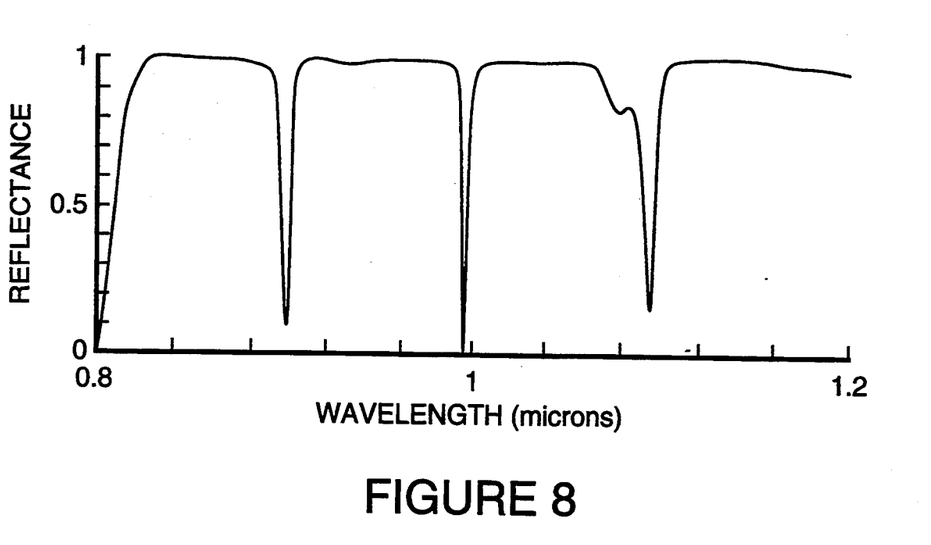
FIG. 8 is a plot of reflectance as a function of wavelength for the triple cavity filter defined by the profile of FIG. 7, showing that the introduction of a halfwave transition layer yields a third pass band.
Figure 9:
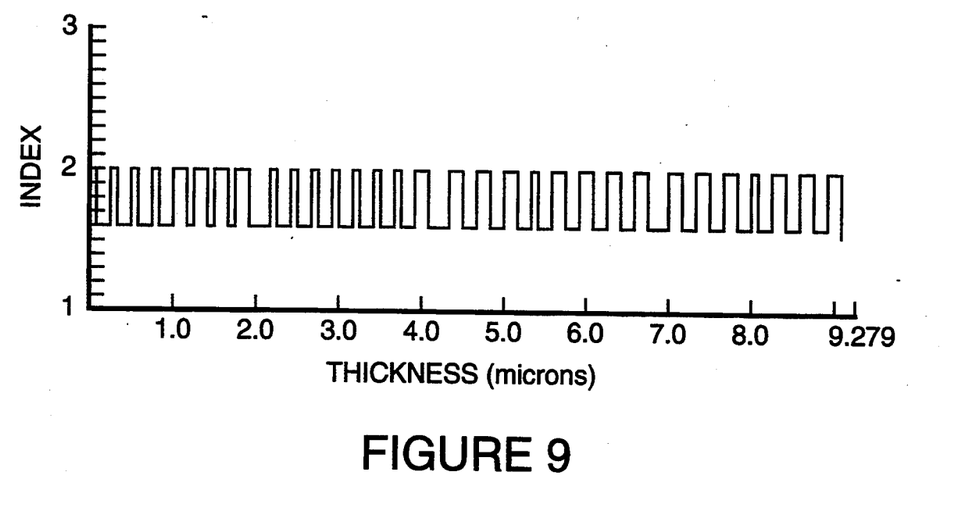
FIG. 9 is a plot of refractive index as a function of thickness similar to that of FIG. 7, except that the middle and upper pass bands are adjusted in wavelength by adjusting the thicknesses of the corresponding halfwave spacer layers. The first and last layers are also thickness adjusted to improve index of refraction matching between the filter and external media of air and glass. The configuration is Air 0.893H0.9(LH)$^7$1.8L0.9(HL)$^7$0.9H2.137L1.092(HL)$^7$1.092H1.882L1.092(HL)$^7$1.326H Glass.
Figure 10:
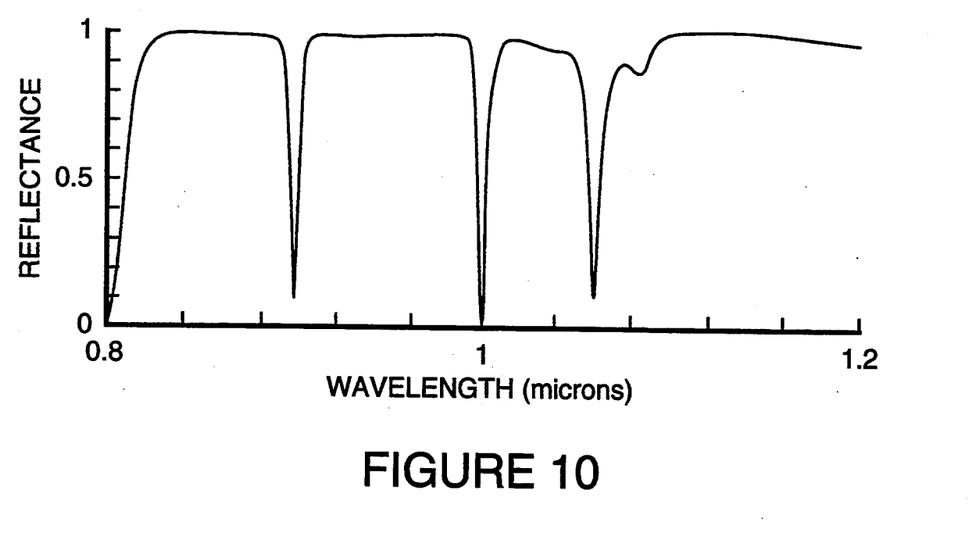
FIG. 10 is a plot of reflectance as a function of wavelength for the triple cavity filter defined by the profile of FIG. 9.

When the cavity filters of FIGS. 3 and 4 are combined with a quarterwave transition layer, a double line filter results, as shown in FIGS. 5 and 6. When the transition layer is halfwave, a three line filter results, as shown in FIGS. 7 and 8. Note, however, that the middle and upper lines are not located at the desired wavelengths for the exemplary embodiment. This may be remedied by adjusting the thicknesses of the spacer layers to tune the desired wavelengths. The final step in the filter design is to match the equivalent index to the surrounding media, thereby increasing the transmittance in the pass bands. In the present example this can be accomplished by simply adjusting the thicknesses of the first and last layers, with the final result shown in FIGS. 9 and 10. FIG. 9 is a plot of refractive index as a function of thickness similar to that of FIG. 7, except that the middle and upper pass bands are adjusted in wavelength by adjusting the thicknesses of the corresponding halfwave spacer layers and the first and last layers are also thickness adjusted to improve index of refraction matching between the filter and external media of air and glass. FIG. 10 is a plot of reflectance as a function of wavelength for the triple cavity filter defined by the profile of FIG. 9.

Figure 11:
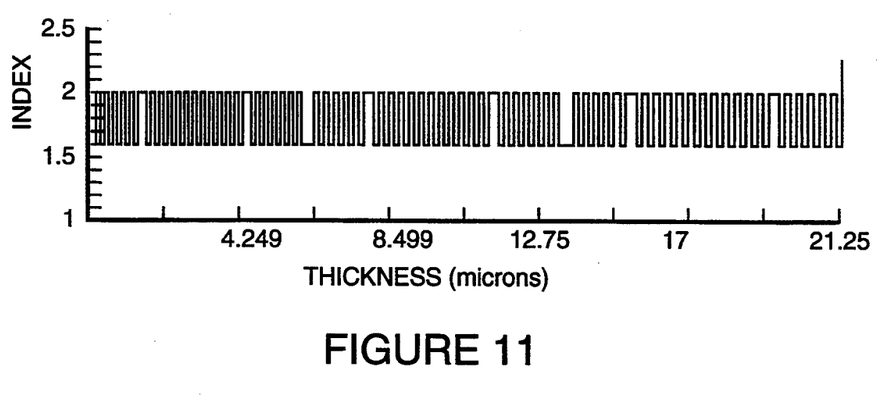
FIG. 11 is a plot of refractive index as a function of thickness for combined triple double cavity filters.
Figure 12:
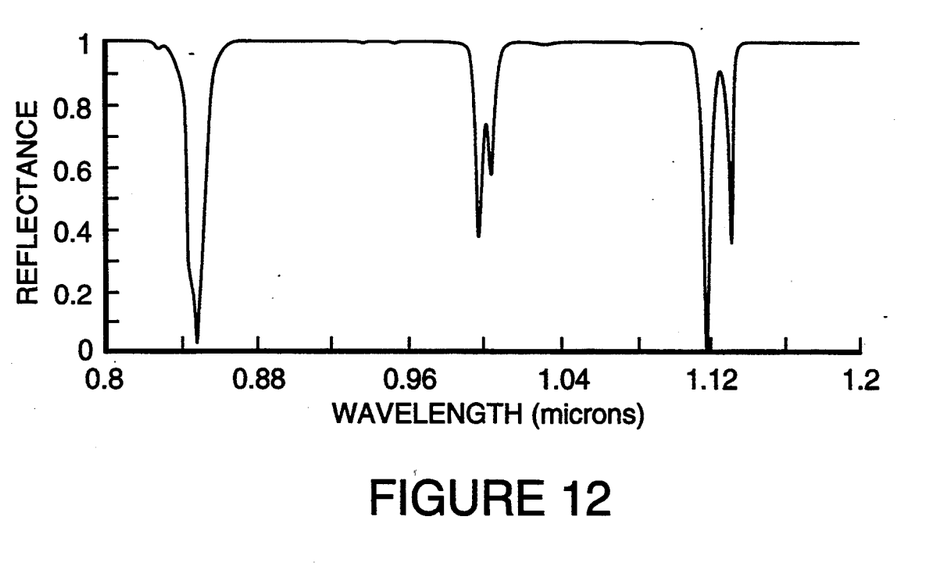
FIG. 12 is a plot of reflectance as a function of wavelength for the triple double cavity filter defined by the profile of FIG. 11.
Figure 13:
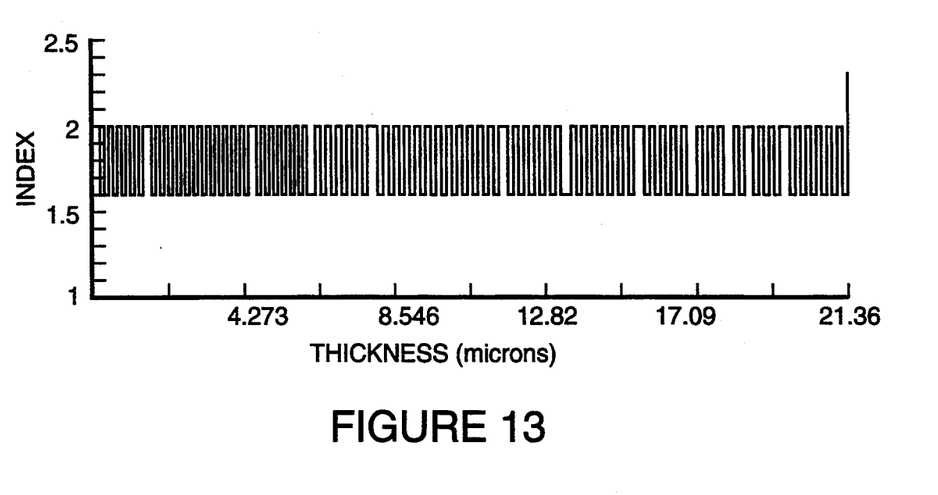
FIG. 13 is a plot of refractive index as a function of thickness for the combined triple double cavity filter of FIG. 11, except that refinement techniques have been used to improve the shape of the pass bands.
Figure 14:
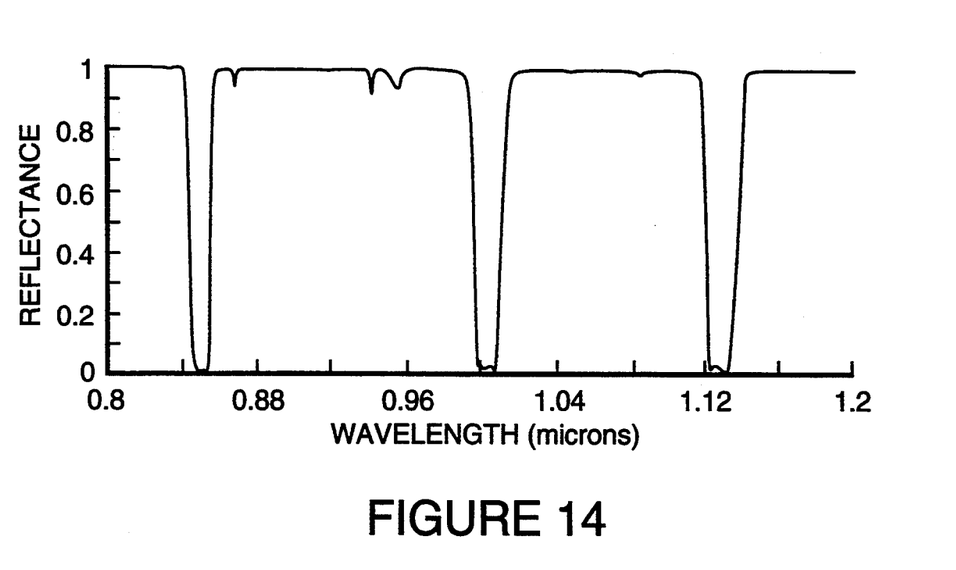
FIG. 14 is a plot of reflectance as a function of wavelength for the triple double cavity filter defined by the profile of FIG. 13.

The invention can also be used to provide multiple double cavity pass bands, by interposing within each quarterwave stack a pair of half wave layers each having an optical thickness which is an integral multiple of one half of the desired pass band wavelength, such that the reflectivities of the portions of the stack on either side of the layer pair are substantially identical. FIG. 11 is a plot of refractive index as a function of thickness for a combined triple double cavity filter made using this approach, while FIG. 12 is a plot of reflectance as a function of wavelength for the filter defined by the profile of FIG. 11. FIG. 13 is a plot of refractive index as a function of thickness for the combined triple double cavity filter of FIG. 11, except that refinement techniques have been applied, illustrating how this can be used to improve the shape of the pass bands, as shown in FIG. 14, which is a plot of calculated reflectance as a function of wavelength for the refined filter design of FIG. 13. Note that the use of a halfwave transition layer to generate a third line cannot be utilized with this double cavity filter technique.

The preferred embodiments of this invention have been illustrated and described above. Modifications and additional embodiments, however, will undoubtedly be apparent to those skilled in the art. Furthermore, equivalent elements may be substituted for those illustrated and described herein, parts or connections might be reversed or otherwise interchanged, and certain features of the invention may be utilized independently of other features. Consequently, the exemplary embodiments should be considered illustrative, rather than inclusive, while the appended claims are more indicative of the full scope of the invention.

The teaching of the following documents, which are referred to herein, is incorporated by reference:

H. A. Macleod, Thin-Film Optical Filters, Pages 170, 194,, & 238 (Macmillan 2nd ed. 1986).

A. F. Turner and P. W. Baumeister, Multilayer mirrors with reflectance over an extended spectral region, Journal of Applied Optics, Volume 5, Pages 69–76 (1966).

I claim:

1. A multiple pass band, thin film optical filter with at least three pass bands located at arbitrary wavelengths, comprising:
   a first single pass band filter having a first pass band at a first wavelength, including:
      a first quarterwave stack of thin film layers alternating between layers of a first dielectric material having a first refractive index and layers of a second dielectric material having a second refractive index, the optical thickness of each layer in the first stack being substantially one fourth of the first wavelength; and
      a first half wave layer interposed within the first stack having an optical thickness which is an integral multiple of one half of the first wavelength, such that the reflectivities of the portions of the first stack on either side of the first half wave layer are substantially identical;
   a second single pass band filter having a second pass band at a second wavelength, including:
      a second quarterwave stack of thin film layers alternating between layers of the first dielectric material and layers of the second dielectric material, the optical thickness of each layer in the second stack being substantially one fourth of the second wavelength; and
      a second half wave layer interposed within the second stack having a thickness which is an integral multiple of one half of the second wavelength, such that the reflectivities of the portions of the second stack on either side of the second half wave layer are substantially identical; and
   a third half wave layer interposed between the first and second single pass band filters having a thickness which is an integral multiple of one half of a third wavelength,
   the first single pass band filter providing a filter with a single cavity pass band at the first wavelength, the second single pass band filter providing a filter with a single cavity pass band at the second wavelength, and the third half wave layer providing a pass band at the third wavelength.

2. The filter of claim 1, wherein:
   the first half wave layer further comprises a first pair of half wave layers interposed within the first stack and each having an optical thickness which is an integral multiple of one half of the first wavelength, such that the reflectivities of the portions of the first stack on either side of the first half wave layer pair are substantially identical and wherein:
   the second half wave layer further comprises a second pair of half wave layers interposed within the second stack and each having an optical thickness which is an integral multiple of one half of the second wavelength, such that the reflectivities of the portions of the second stack on either side of the second half wave layer pair are substantially identical,
   the first and second single pass band filters being combined in series to provide a filter with a double cavity pass band at the first wavelength and a double cavity pass band at the second wavelength.

3. A method of making a multiple pass band, thin film optical filter with at least three pass bands located at arbitrary wavelengths, comprising the steps of:
   providing a first single pass band filter having a first pass band at a first wavelength, including the steps of:
      providing a first quarterwave stack of thin film layers alternating between layers of a first dielectric material having a first refractive index and layers of a second dielectric material having a second refractive index, the optical thickness of each layer in the first stack being substantially one fourth of the first wavelength; and
      interposing within the first stack a first half wave layer having an optical thickness which is an integral multiple of one half of the first wavelength, such that the reflectivities of the portions of the first stack on either side of the first half wave layer are substantially identical;

providing a second single pass band filter having a second pass band at a second wavelength, including the steps of:

providing a second quarterwave stack of thin film layers alternating between layers of the first dielectric material and layers of the second dielectric material, the optical thickness of each layer in the second stack being substantially one fourth of the second wavelength; and interposing within the second stack a second half wave layer having a thickness which is an integral multiple of one half of the second wavelength, such that the reflectivities of the portions of the second stack on either side of the second half wave layer are substantially identical;

combining the first and second single pass band filters in series to provide a filter with a single cavity pass band at the first wavelength and a single cavity pass band at the second wavelength; and interposing between the first and second single pass band filters a third half wave layer having a thickness which is an integral multiple of one half of a third wavelength, thereby providing a third pass band at a third wavelength.

4. The filter of claim 3, wherein the step of interposing within the first stack further comprises:

interposing within the first stack a first pair of half wave layers each having an optical thickness which is an integral multiple of one half of the first wavelength, such that the reflectivities of the portions of the first stack on either side of the first half wave layer pair are substantially identical; the step of interposing within the second stack further comprises:

interposing within the second stack a second pair of half wave layers having an optical thickness which is an integral multiple of one half of the second wavelength, such that the reflectivities of the portions of the second stack on either side of the second half wave layer pair are substantially identical; and the step of combining further comprises:

combining the first and second single pass band filters in series to provide a filter with a double cavity pass band at the first wavelength and a double cavity pass band at the second wavelength.

* * * * *